(12) United States Patent
Ohashi et al.

(10) Patent No.: US 11,577,694 B2
(45) Date of Patent: Feb. 14, 2023

(54) AUTHENTICATION DEVICE, AUTHENTICATION METHOD, AND AUTHENTICATION SYSTEM

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Yosuke Ohashi, Aichi (JP); Rijin Owaki, Aichi (JP); Takahiko Ando, Aichi (JP); Yasuhisa Ohta, Aichi-ken (JP); Yuya Goto, Aichi-ken (JP); Naoyuki Takada, Aichi-ken (JP); Daisuke Ogawa, Aichi (JP)

(73) Assignees: KABUSHIKI KAISHA TOKAI RIKA DENKI SEISAKUSHO, Aichi (JP); TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 17/272,909

(22) PCT Filed: Aug. 28, 2019

(86) PCT No.: PCT/JP2019/033786
§ 371 (c)(1),
(2) Date: Mar. 2, 2021

(87) PCT Pub. No.: WO2020/050116
PCT Pub. Date: Mar. 12, 2020

(65) Prior Publication Data
US 2021/0197767 A1  Jul. 1, 2021

(30) Foreign Application Priority Data
Sep. 4, 2018 (JP) .............................. JP2018-165271

(51) Int. Cl.
*B60R 25/25* (2013.01)
*B60R 25/23* (2013.01)
(Continued)

(52) U.S. Cl.
CPC .............. *B60R 25/25* (2013.01); *B60R 25/23* (2013.01); *B60R 25/246* (2013.01); *B60R 25/31* (2013.01)

(58) Field of Classification Search
CPC ....... B60R 25/25; B60R 25/23; B60R 25/246; B60R 25/31
(Continued)

(56) References Cited

U.S. PATENT DOCUMENTS

| 7,916,005 B2 | 3/2011 | Nakane |
| 2006/0098847 A1 | 5/2006 | Takahashi |

(Continued)

FOREIGN PATENT DOCUMENTS

| JP | 2004-190380 A | 7/2004 |
| JP | 2006-016791 A | 1/2006 |

(Continued)

OTHER PUBLICATIONS

Machine translation of JP 2008276359 A (Year: 2008).*

*Primary Examiner* — Kam Wan Ma
(74) *Attorney, Agent, or Firm* — Thomas W. Cole; Calderon Safran & Cole P.C.

(57) ABSTRACT

An authentication device includes a last session information storage portion that stores data of a first registered person successfully authenticated in the last session, an input unit to which information of a second registered person successfully authenticated by another authentication device is input, an information acquisition unit that acquires identification information of a user via an information sensor, a registered person information storage portion that stores registered
(Continued)

person information in which a plurality of registered persons including the first and second registered persons are associated with their registration identification information, an authentication order information storage portion that stores information about an authentication order of the registered persons, and an authentication unit that authenticates the user by comparing the identification information acquired from the information acquisition unit with the registration identification information stored in the registered person information storage portion according to the stored authentication order.

9 Claims, 4 Drawing Sheets (51) Int. Cl.
*B60R 25/24* (2013.01)
*B60R 25/31* (2013.01)

(58) Field of Classification Search
USPC .................................................. 340/426.36
See application file for complete search history.

(56) References Cited

U.S. PATENT DOCUMENTS

| | | |
|---|---|---|
| 2006/0276286 A1 | 12/2006 | Mott et al. |
| 2007/0024419 A1 | 2/2007 | Nakane |
| 2007/0177766 A1 | 8/2007 | Kasahara et al. |
| 2010/0253471 A1* | 10/2010 | Abe .................. G06F 21/32 |
| | | 340/5.83 |

FOREIGN PATENT DOCUMENTS

| | | | |
|---|---|---|---|
| JP | 2006-131031 A | | 5/2006 |
| JP | 2006-336420 A | | 12/2006 |
| JP | 2008276359 A | * | 11/2008 |
| JP | 2010-208554 A | | 9/2010 |
| JP | 2019202643 A | * | 11/2019 |

* cited by examiner

AUTHENTICATION DEVICE, AUTHENTICATION METHOD, AND AUTHENTICATION SYSTEM

CROSS-REFERENCES TO RELATED APPLICATIONS

The present patent application claims the priority of Japanese patent application No. 2018/165271 filed on Sep. 4, 2018, and the entire contents of Japanese patent application No. 2018/165271 are hereby incorporated by reference.

The present invention relates to an authentication device, an authentication method and an authentication system.

BACKGROUND ART

A vehicle anti-theft device is known which is provided with a handheld device authentication means that authenticates a handheld device based on identification information received from the handheld device, a driver authentication means that acquires driver identification information unique to a driver and authenticates the driver as a preliminarily registered driver based on comparison with pre-registered driver identification information, an information input means receiving an input of setting information that is information set by the registered driver, and an authentication control means that selects either authentication using the driver authentication means or authentication based on the setting information input by the registered driver and controls start of a vehicle based on an authentication result from the selected authentication and an authentication result provided by the handheld device authentication means (see, e.g., Patent Literature 1).

CITATION LIST

Patent Literature

Patent Literature 1: JP 2010/208554 A

SUMMARY OF INVENTION

Technical Problem

When the vehicle anti-theft device disclosed in Patent Literature 1 is used by, e.g., a person who is not a registered person registered with the handheld device, authentication time may increase because of where in the authentication order.

It is an object of the invention to provide an authentication device, an authentication method and an authentication system that can reduce time required for authentication.

Solution to Problem

According to an embodiment of the invention, an authentication device comprises:
  a last session information storage portion that stores data of a first registered person successfully authenticated in the last session;
  an input unit to which information of a second registered person successfully authenticated by another authentication device is input;
  an information acquisition unit that acquires identification information of a user via an information sensor;
  a registered person information storage portion that stores registered person information in which a plurality of registered persons including the first and second registered persons are associated with their registration identification information;
  an authentication order information storage portion that stores information about an authentication order of the registered persons; and
  an authentication unit that authenticates the user by comparing the identification information acquired from the information acquisition unit with the registration identification information stored in the registered person information storage portion according to the authentication order stored in the authentication order information storage portion,
  wherein the authentication unit sets the authentication order in the authentication order information storage portion so that the first registered person and the second registered person are combined and are placed first and second in the order.

According to another embodiment of the invention, an authentication method comprises performing authentication in an authentication order that is set so that a first registered person successfully authenticated in the last session and a second registered person successfully authenticated by another authentication device are combined and are placed first and second in the order.

According to another embodiment of the invention, an authentication system comprises:
  another authentication device that performs authentication by checking whether or not a second registered person is a registered person; and
  an authentication device comprising an authentication unit that performs authentication in an authentication order that is set so that a first registered person successfully authenticated in the last session and the second registered person successfully authenticated by the other authentication device are combined and are placed first and second in the order.

Advantageous Effects of Invention

According to an embodiment and other embodiments of the invention, it is possible to provide an authentication device, an authentication method and an authentication system that can reduce time required for authentication.

DESCRIPTION OF EMBODIMENTS

Short Summary of the Embodiment

An authentication device in an embodiment has an authentication unit that performs authentication in an authentication order that is set so that a first registered person successfully authenticated in the last session and a second registered person successfully authenticated by another authentication device are combined and are placed first and second in the order.

This authentication device is configured that the first registered person successfully authenticated in the last session and the second registered person successfully authenticated by another authentication device are placed first and second in the authentication order. Therefore, as compared to when such a configuration is not adopted, time required for authentication can be reduced since the probability of successful authentication of persons placed first and second in the authentication order is high.

An authentication method in another embodiment includes performing authentication in an authentication order that is set so that the first registered person successfully authenticated in the last session and the second registered person successfully authenticated by another authentication device are combined and are placed first and second in the order.

In this authentication method, the first registered person successfully authenticated in the last session and the second registered person successfully authenticated by another authentication device are placed first and second in the authentication order. Therefore, as compared to when such a configuration is not adopted, time required for authentication can be reduced since the probability of successful authentication of persons placed first and second in the authentication order is high.

An authentication system in still another embodiment has another authentication device that performs authentication by checking whether or not the second registered person is a registered person, and an authentication device having an authentication unit that performs authentication in an authentication order that is set so that the first registered person successfully authenticated in the last session and the second registered person successfully authenticated by another authentication device are combined and are placed first and second in the order.

This authentication system is configured that the first registered person successfully authenticated in the last session and the second registered person successfully authenticated by another authentication device are placed first and second in the authentication order. Therefore, as compared to when such a configuration is not adopted, time required for authentication can be reduced since the probability of successful authentication of persons placed first and second in the authentication order is high.

EMBODIMENTS (General Configuration of an Authentication Device 1)

Figure 1A:
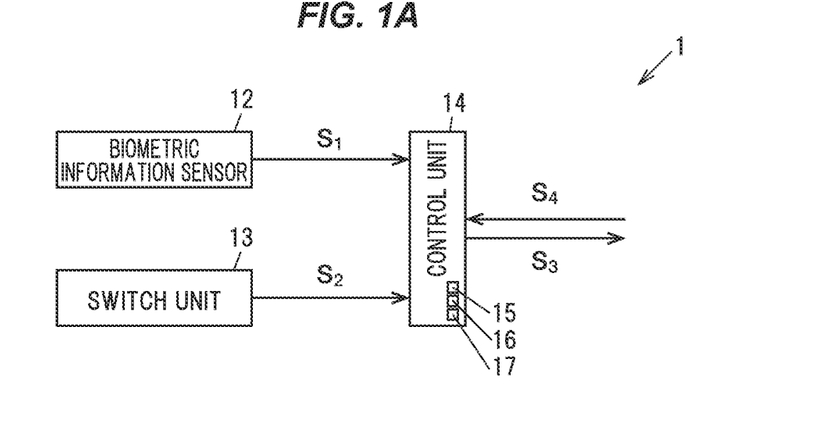
FIG. 1A is a block diagram illustrating an authentication device in an embodiment.
Figure 1B:
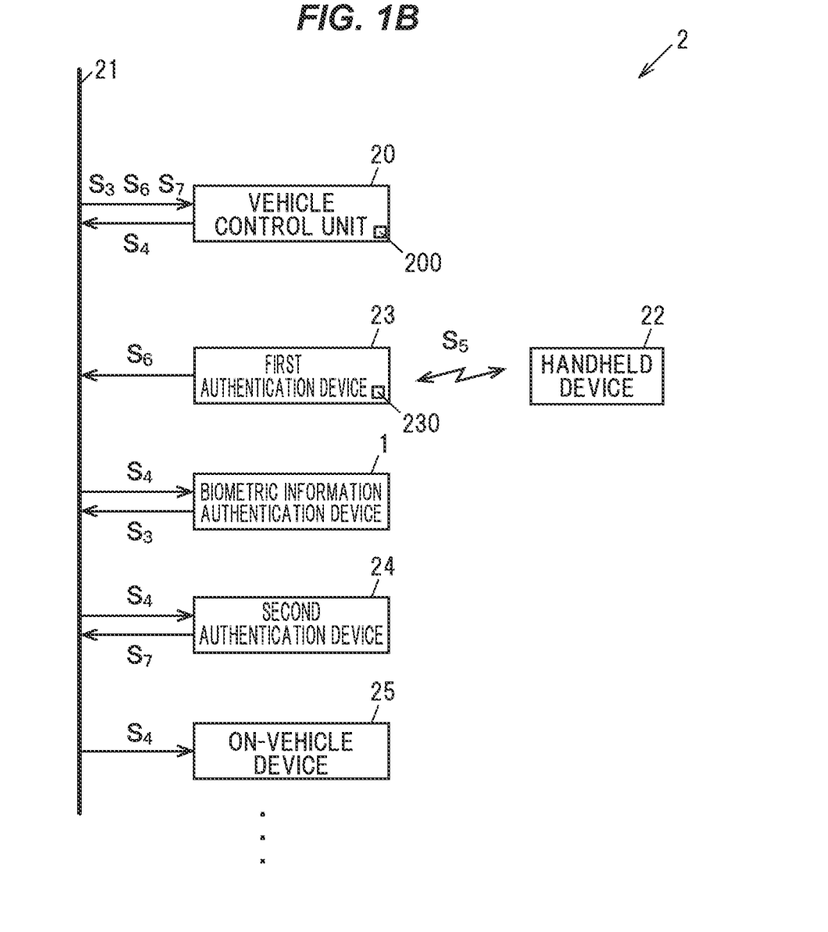
FIG. 1B is a block diagram illustrating an authentication system that includes the authentication device in the embodiment.

An example of the authentication device 1 in the embodiments will be described below in reference to each drawing. In FIGS. 1A and 1B, flows of main signals and information are indicated by arrows.

Figure 2A:
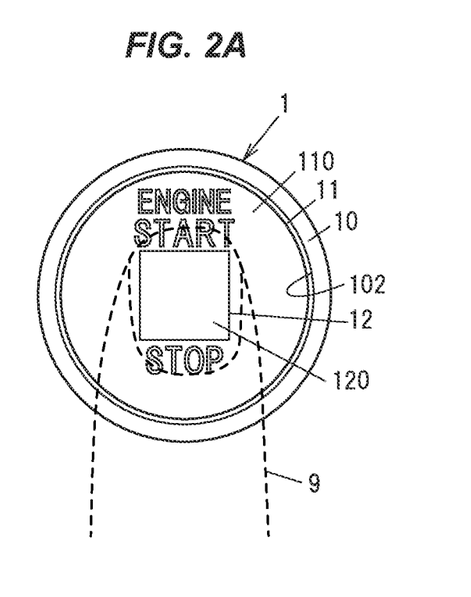
FIG. 2A is an explanatory diagram illustrating the authentication device in the embodiment.

The authentication device 1 performs authentication using biometric information or authentication using other than biometric information. As an example, the authentication device 1 in the present embodiment is configured as a start switch device that gives an instruction to start or stop a drive system of a vehicle and perform the power state transition based on authentication of biometric information, as shown in FIGS. 1A and 2A. The authentication device 1 as a start switch device is provided with, e.g., a cylindrical main body 10 and an operation button 11, as shown in FIG. 2A. The operation button 11 is inserted into an opening 102 of the main body 10 and is configured to move toward the main body 10 by a push operation performed on an operation surface 110.

The authentication device 1 also has, e.g., a biometric information sensor 12, a switch unit 13, and a control unit 14 as the authentication unit, as shown in FIG. 1A. In this regard, the authentication device 1 is not limited to the start switch device and may be a device that performs biometric authentication for login, unlock or payment, etc.

Figure 3A:
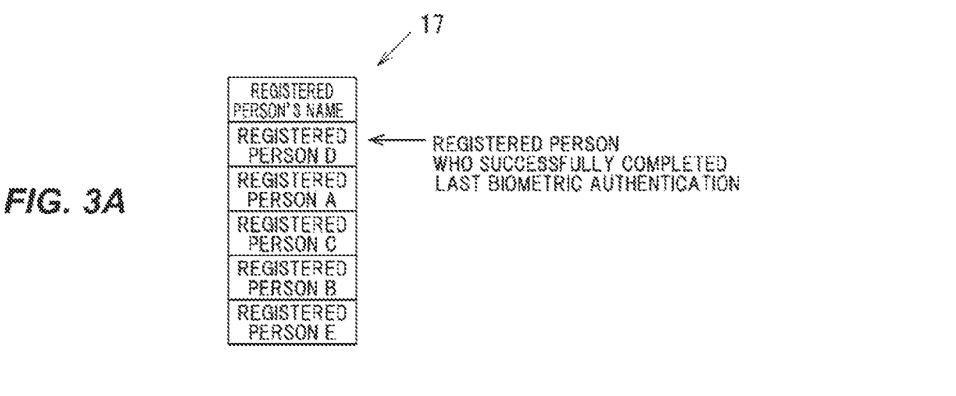
FIG. 3A is an explanatory diagram for explaining how authentication order information is produced by the authentication device in the embodiment.
Figure 3B:
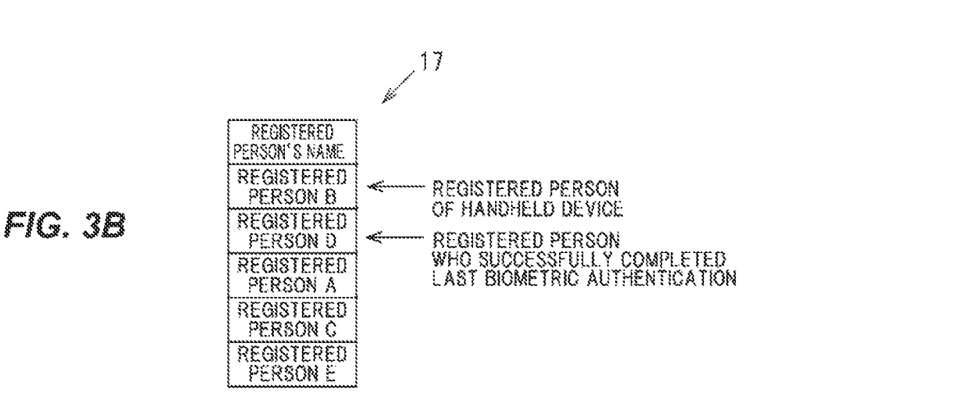
FIG. 3B is an explanatory diagram for explaining how the authentication order information is produced by the authentication device in the embodiment.
Figure 3C:
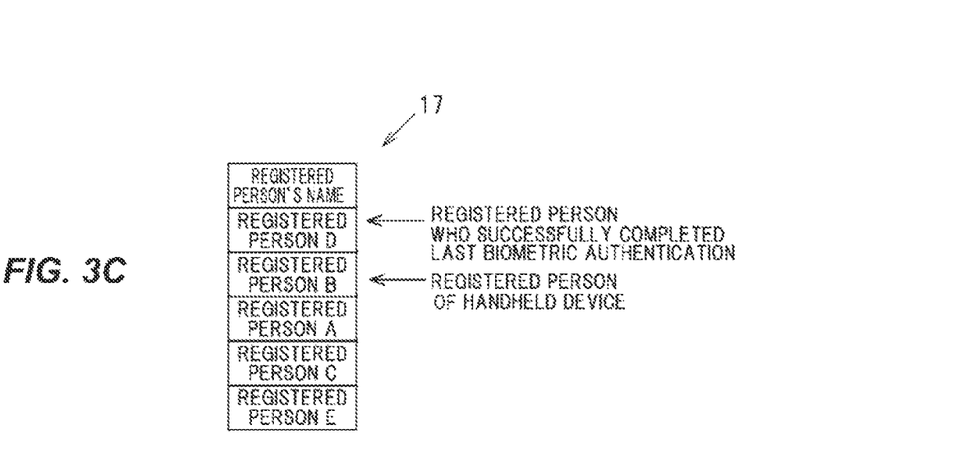
FIG. 3C is an explanatory diagram illustrating a modification of the authentication order information produced by the authentication device in the embodiment.

The control unit 14 is configured to, e.g., perform authentication in an authentication order that is set so that a first registered person (a registered person D) successfully authenticated in the last session and a second registered person (a registered person B) successfully authenticated by another authentication device are combined and are placed first and second in the order, as shown in FIGS. 3A to 3C.

A first authentication device 23 is mounted on a vehicle and is configured to communicate with a handheld device 22 carried by a user approaching the vehicle and perform authentication. Meanwhile, the control unit 14 is configured to obtain biometric information 122 of a user operating the start switch device of the vehicle and perform authentication (biometric authentication) by comparing the biometric information 122 with registered biometric information 15 that is preliminarily registered.

The authentication device 1 constitutes, e.g., a part of an authentication system 2 shown in FIG. 1B.

The authentication system 2 has, e.g., the first authentication device 23 that performs authentication by checking whether or not the second registered person is a registered person, and the authentication device 1 provided with the above-described control unit 14, as shown in FIG. 1B.

The authentication system 2 in the present embodiment is configured that, e.g., a vehicle control unit 20 generates and outputs identification information $S_4$ identifying the second registered person as shown in FIG. 1B, but it is not limited thereto. The authentication system 2 as a modification may be configured to include an authentication device that performs authentication by checking whether or not the second registered person is a registered person, an identification device that outputs the identification information $S_4$ identifying the second registered person who is successfully authenticated by the authentication device, and the authentication device 1 provided with the above-described control unit 14. This identification device is configured to, e.g., acquire information (ID information $S_5$) of a registered person of the handheld machine 22 and then generate the identification information $S_4$ identifying this person.

(Configuration of the Biometric Information Sensor 12)

The biometric information sensor 12 is configured to, e.g., read the biometric information 122 of the registered person and output it to the control unit 14. The biometric information sensor 12 is mounted on the operation button 11 as an example. Alternatively, the biometric information sensor 12 may be mounted on a position other than the start switch device and used for authentication using biometric information such as a facial image, an iris, etc.

In case that the biometric information sensor 2 reads a fingerprint, it is performed by using, e.g., a sensor of optical, capacitive, electric field strength measuring, pressure-sensitive, or thermal type, etc., which is configured to read a fingerprint pattern.

In case of reading a vein of an operating finger or of a palm, it is performed by using, e.g., a sensor configured to read a vein pattern based on reflection of emitted infrared radiation.

In case of acquiring a facial image, it is performed by using, e.g., a sensor configured to read an uneven shape on a subject based on depths at plural measurement points on the captured subject.

In case of reading an iris, it is performed by using, e.g., a sensor configured to read an iris by processing an image captured under infrared light emission.

The biometric information sensor 12 in the present embodiment is a capacitive sensor, as an example. The biometric information sensor 12 is configured to e.g., read a fingerprint pattern from an operating finger 9 in contact with a reading surface 120 exposed on the operation surface 110 of the operation button 11 as shown in FIG. 2A and outputs it as capacitance information $S_1$.

The reading surface 120 may alternatively be arranged under the operation surface 110 without being exposed on the operation surface 110. In addition, the shape of the reading surface 120 is not limited to, e.g., a rectangle and may be a circle or an ellipse.

The biometric information sensor 12 is provided with, e.g., plural detection electrodes which are arranged in rows and columns in a grid pattern under the reading surface 120. As an example, several ten thousand to several hundred thousand detection electrodes are formed and arranged at intervals of several µm to several tens µm.

The biometric information sensor 12 is configured to scan all detection electrodes by, e.g., repeating a process of reading capacitances of the detection electrodes arranged in one row while changing columns and then subsequently reading capacitances of the detection electrodes arranged in a different row. The scanning cycle is about 100 ms, as an example.

The biometric information sensor 12 outputs, e.g., the capacitance information $S_1$, which is generated based on plural capacitances read by scanning, to the control unit 14. The capacitance information $S_1$ is generated based on, e.g., capacitances in one cycle.

In particular, the biometric information sensor 12 generates the capacitance information $S_1$ by, e.g., dividing the capacitances into two values in such a manner that capacitances of not less than a predetermined threshold value are assigned "1" and capacitances of less than the threshold value are assigned "0", and then associating the capacitances with the positions of the detection electrodes.

Figure 2B:
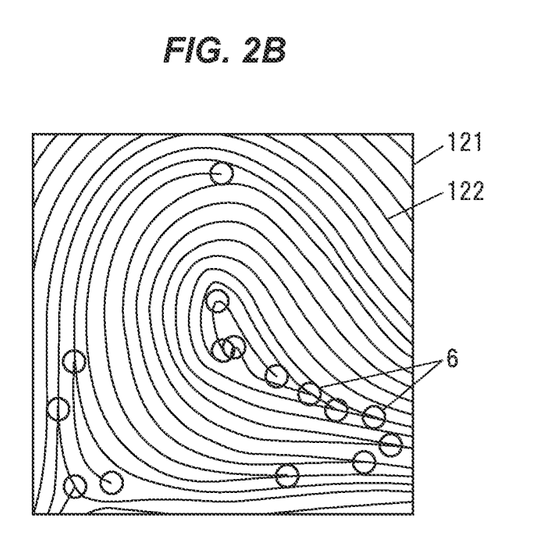
FIG. 2B is an explanatory diagram illustrating biometric information that is read by a biometric information sensor of the authentication device in the embodiment.

A captured image 121 shown in FIG. 2B is obtained based on the capacitance information $S_1$ and is produced in such a manner that the positions of the detection electrodes assigned "1" described above are shown in black and the positions of the detection electrodes assigned "0" are shown in white, as an example. The circles in the drawing are added to show some of characteristic features 6 (described later).

The high-capacitance positions are positions of ridges of the fingerprint which are close to the detection electrodes, hence, capacitance is high. Meanwhile, the low-capacitance positions are positions of valleys of the fingerprint which are far from the detection electrodes, hence, capacitance is low.

Therefore, as an example, the captured image 121 shown in FIG. 2B is obtained when the high-capacitance positions are shown in black and the low-capacitance positions are shown in white. The image shown in black in the captured image 121 is the read biometric information 122.

(Configuration of the Switch Unit 13)

As an example, the switch unit 13 is configured as a rubber dome switch which comes into contact with an end portion of the operation button 11 on the opposite side to the operation surface 110. The rubber dome switch is provided with, e.g., a rubber dome which generates an elastic force and has a movable contact, and a switch substrate on which the rubber dome is arranged and which has a fixed contact facing the movable contact.

When the operation button 11 is pushed in by a push operation, the movable contact is electrically conducted to the fixed contact due to deformation of the rubber dome and a switch signal $S_2$, which indicates that the switch unit 13 is turned on, is output to the control unit 14. The operation button 11 is configured to return to the initial position by an elastic force of the rubber dome when, e.g., the push operation ends.

(Configuration of the Control Unit 14)

The control unit 14 is, e.g., a microcomputer composed of a CPU (Central Processing Unit) performing calculation and processing, etc., of the acquired data according to a stored program, and a RAM (Random Access Memory) and a ROM (Read Only Memory) as semiconductor memories, etc. The ROM stores, e.g., a program for operation of the control unit 14. The RAM is used as, e.g., a storage area for storing the registered biometric information 15, an authentication threshold value 16 and authentication order information 17 and for temporarily storing calculation results, etc. In addition, the control unit 14 has, inside thereof, a means for generating a clock signal, and operates based on the clock signal. The authentication method described later may be provided as a program executed by this microcomputer, as an example.

The registered biometric information 15 is, e.g., information associating a registered person's name with a template. The registered person's name is, e.g., to identify a registered person who has registered the registered biometric information 15. The template is composed of, e.g., the characteristic features 6 of the biometric information 122 that is read by the biometric information sensor 12. In this regard, the registered biometric information 15 is created for each biometric information 122 of the finger registered by the user. The characteristic features 6 are extracted by, e.g., a process of extracting ridges from the biometric information 122.

In particular, the characteristic feature 6 is, e.g., a center point, a bifurcation point, an ending point or a delta, etc., as shown in FIG. 2B, but it is not limited thereto. The center point is a point at the center of the fingerprint. The bifurcation point is a point at which a fingerprint ridge bifurcates. The ending point is a point at which a ridge ends. The delta is a point at which ridges from three directions meet.

The control unit 14 compares, e.g., the characteristic features 6 of the read registered biometric information 122 of the user to the template in the registered biometric information 15 and calculates a degree of similarity based on the positions of the characteristic features 6 and distances between the characteristic features 6, etc. Then, when the degree of similarity is not less than the authentication threshold value 16, the control unit 14 outputs biometric authentication information $S_3$ indicating that the user is the registered person, i.e., the biometric authentication is successfully completed.

The authentication threshold value 16 is defined that the degree of similarity of the subject of comparison such as the positions of the characteristic features 6 and the distances between the characteristic features 6, etc., is 80%, as an example. In other words, when, e.g., the number of the subjects of comparison used for biometric authentication is eighty and when match is found for not less than sixty-four subjects of comparison, the control unit 14 determines that the user is the registered person.

When, e.g., authentication is successful, the control unit 14 outputs the biometric authentication information $S_3$, which indicates that the authentication is successful, to the vehicle control unit 20. When the biometric authentication information $S_3$ is input via an in-vehicle LAN 21, the vehicle control unit 20 controls a target electronic device on the basis of the successful authentication. In the present embodiment, start-up of the drive system and the power state transition are performed based on the biometric authentication information $S_3$, as an example.

The biometric authentication is not limited to being performed by the authentication method using the degree of similarity of the characteristic features 6 and may be performed by an authentication method such as pattern matching.

The authentication order information 17 is, e.g., information about an order of performing biometric authentication, as shown in FIGS. 3A to 3C. The control unit 14 performs biometric authentication in this order of performing biometric authentication. An example, in which the authentication order is set so that the first registered person (the registered person D) successfully authenticated in the last session is placed second in the order and the second registered person (the registered person B) successfully authenticated by the first authentication device 23 is placed first, will be firstly described below.

When, e.g., the user in the last session of biometric authentication is the registered person D, the control unit 14 changes the authentication order so that the registered biometric information 15 of the registered person D is placed at the top of the list, as shown in FIG. 3A. In the authentication order information 17 shown in FIG. 3A, the registered persons are listed in the order of, e.g., the registered person D, the registered person A, the registered person C, the registered person B and the registered person E.

Then, when, e.g., authentication by the first authentication device 23 is successfully completed, the control unit 14 further changes the authentication order so that the registered person B of the handheld device 22 is placed at the top of the list, as shown in FIG. 3B. In the authentication order information 17 shown in FIG. 3B, the registered persons are listed in the order of, e.g., the registered person B, the registered person D, the registered person A, the registered person C and the registered person E.

Thus, when the user gets in the vehicle and operates the operation button 11, the authentication device 1 performs biometric authentication according to, e.g., the authentication order in the authentication order information 17 shown in FIG. 3B.

Next, an example, in which the authentication order is set so that the first registered person (the registered person D) successfully authenticated in the last session is placed first in the order and the second registered person (the registered person B) successfully authenticated by the first authentication device 23 is placed second, will be described.

When, e.g., the user in the last session of biometric authentication is the registered person D, the control unit 14 changes the authentication order so that the registered biometric information 15 of the registered person D is placed at the top of the list, as shown in FIG. 3A.

Then, when, e.g., authentication by the first authentication device 23 is successfully completed, the control unit 14 further changes the authentication order so that the registered person B of the handheld device 22 is placed second in the list, as shown in FIG. 3C. In the authentication order information 17 shown in FIG. 3C, the registered persons are listed in the order of, e.g., the registered person D, the registered person B, the registered person A, the registered person C and the registered person E.

In this authentication order, for example, the registered person B of the handheld device 22 and the registered person successfully biometrically authenticated in the last session are placed first and second. Therefore, even if the registered person D gets in the vehicle carrying the handheld device of the registered person B, an increase in time until successful biometric authentication caused by the low priority order can be suppressed since persons placed first and second in the authentication order are highly likely to be successfully authenticated.

Next, the authentication order in which the first registered person is placed second and the second registered person is placed first will be mainly described.

(Configuration of the Authentication System 2)

The authentication system 2 is further provided with, e.g., the vehicle control unit 20 and the in-vehicle LAN (Local Area Network) 21, as shown in FIG. 1B.

The vehicle control unit 20 of the authentication system 2 is, e.g., a microcomputer composed of a CPU, a RAM and a ROM, etc. The ROM stores, e.g., a program for operation of the authentication system 2. The RAM stores registered person setting information 200 for identifying the registered person.

The vehicle control unit 20 controls, e.g., electronic devices mounted on the vehicle and communication via the in-vehicle LAN 21, etc. The in-vehicle LAN 21 enables intercommunication using a standard such as CAN (Controller Area Network) and LIN (Local Interconnect Network), as an example.

The in-vehicle LAN 21 is electromagnetically connected to, e.g., the authentication device 1, the first authentication device 23, a second authentication device 24 and an on-vehicle device 25. Additionally, plural authentication devices or on-vehicle devices may be connected to the in-vehicle LAN 21.

The handheld device 22 is, e.g., an electronic key or smartphone that is registered with the vehicle. In the present embodiment, plural handheld devices 22 can be registered with the vehicle. The handheld device 22 has, e.g., the ID information $S_5$ of the registered person.

The handheld device 22 wirelessly communicates with the first authentication device 23 and transmits the ID information $S_5$, as an example. The first authentication device 23 compares the received ID information $S_5$ with registration information 230 stored therein and determines whether or not the handheld device 22 is registered with the vehicle.

When authentication is successful, the first authentication device 23 generates authentication information $S_6$ including information of the registered person of the handheld device 22 and outputs it to the vehicle control unit 20 via the in-vehicle LAN 21. Based on the authentication information $S_6$ and the registered person setting information 200, the vehicle control unit 20 outputs the identification information $S_4$ identifying the registered person.

The identification information $S_4$ is output to, e.g., the authentication device 1, the second authentication device 24 and the on-vehicle device 25. The authentication device 1 and the second authentication device 24 place the registered person identified based on the identification information $S_4$ at the top of the authentication order.

The on-vehicle device 25 implements, e.g., a setting that has been set by the registered person identified based on the identification information $S_4$. The on-vehicle device 25 when being a seat device adjusts the seat to, e.g., the position and angle, etc., that have been set by the registered person identified based on the identification information $S_4$. Meanwhile, the on-vehicle device 25 when being an air conditioner adjusts to, e.g., the set temperature and the air volume, etc., that have been set by the registered person.

The second authentication device 24 is provided with a control unit that is, e.g., a microcomputer composed of a CPU, a RAM and a ROM, etc. The authentication method described later may be provided as a program executed by this microcomputer, as an example.

The second authentication device 24 performs, e.g., authentication other than biometric authentication. The authentication other than biometric authentication is, e.g., authentication using writing pressure, authentication pattern, address, password, key, smartphone, etc. When, e.g., the authentication is successfully completed, the second authentication device 24 outputs authentication information $S_7$ indicating successful authentication to the vehicle control unit 20. When the authentication information $S_7$ is input via the in-vehicle LAN 21, the vehicle control unit 20 controls a target electronic device on the basis of this successful authentication.

Figure 4:
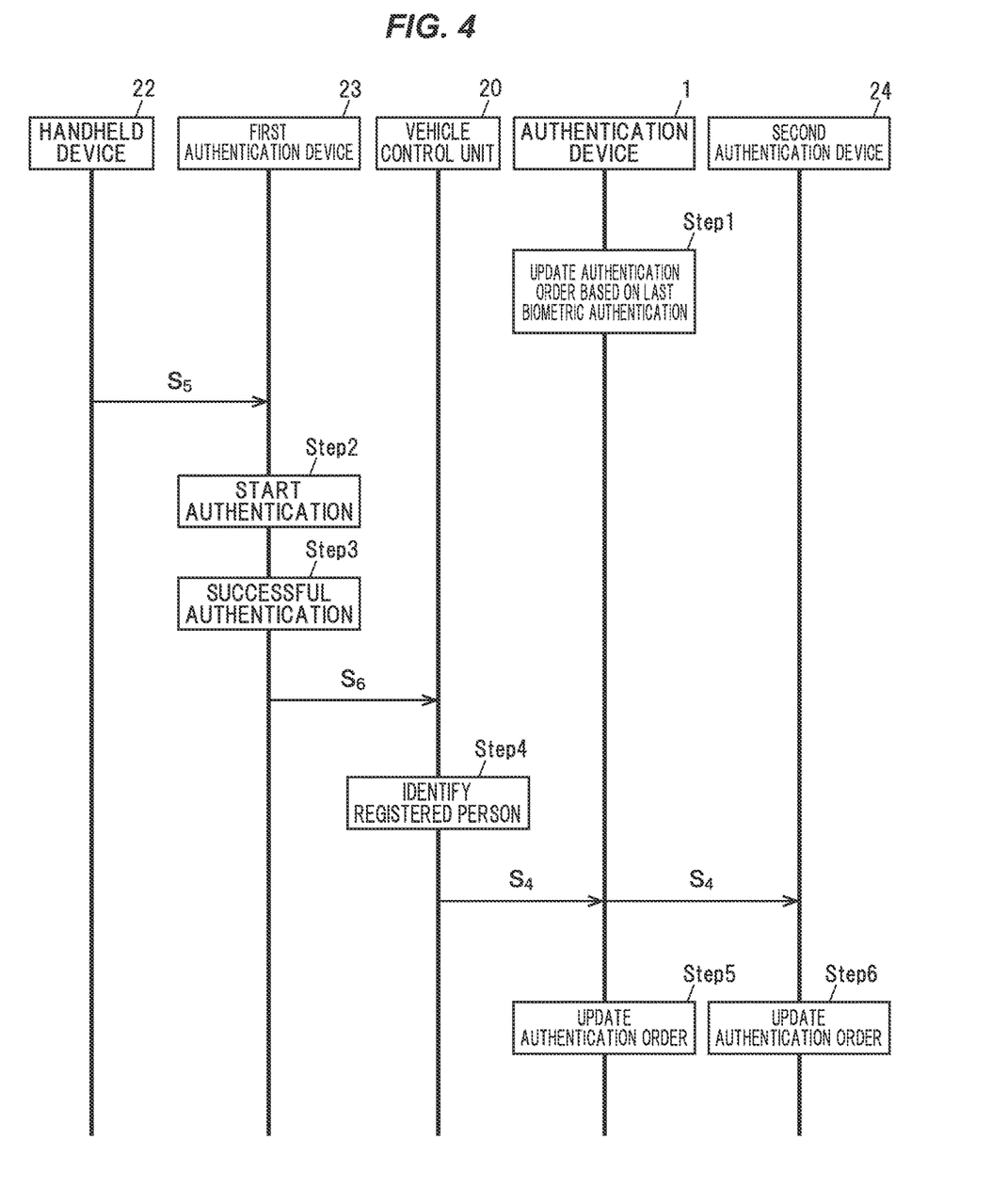
FIG. 4 is an explanatory timing diagram illustrating an operation of the authentication device and an authentication system in the embodiments.

Next, an example of an operation of the authentication device 1 and the authentication system 2 in the present embodiments to update the authentication order will be described along with the timing diagram of FIG. 4.

(Operation)

The authentication device 1 updates the authentication order so that registered person successfully completed biometric authentication in the last session is placed at the top in the authentication order (Step 1). This update is performed after the user gets in the vehicle and successfully completes biometric authentication. The user gets off the vehicle later.

When the next user carrying the handheld machine 22 approaches the vehicle to get in the vehicle, the first authentication device 23 communicates with the handheld machine 22 and starts authentication (Step 2).

In particular, the first authentication device 23 wirelessly communicates with the handheld device 22 that has approached the vehicle, i.e., that has entered the communication range, and checks whether or not the handheld device 22 is registered based on the ID information $S_5$ acquired from the handheld device 22 and the registration information 230. When authentication is successful (Step 3), the first authentication device 23 sends information of the authenticated registered person (the authentication information S) to the vehicle control unit 20 via the in-vehicle LAN 21.

Next, the vehicle control unit 20 unlocks the door of the vehicle, and also identifies the registered person based on the input authentication information $S_6$, generates the identification information $S_4$ and outputs it to the authentication device 1, the second authentication device 24, etc. (Step 4).

The control unit 14 of the authentication device 1 updates the authentication order so that the registered person, who has been identified based on the input identification information $S_4$ and successfully authenticated by the first authentication device 23, is placed at the top in the authentication order (Step 5). The control unit 14 then performs biometric authentication based on the authentication order information 17 containing the updated authentication order. Alternatively, the control unit 14 may set the authentication order so that the registered person successfully completed biometric authentication in the last session is placed first in the order and the registered person of the handheld device 22 is placed second.

The second authentication device 24 also updates the authentication order so that the registered person, who has been identified based on the input identification information $S_4$, is placed at the top in the authentication order (Step 6). The second authentication device 24 then performs biometric authentication based on the uprated authentication order. Alternatively, the second authentication device 24 may set the authentication order so that the registered person successfully authenticated by itself in the last session is placed first in the order and the registered person of the handheld device 22 is placed second.

Effects of the Embodiments

The authentication device 1 in the present embodiment can reduce time required for authentication. In particular, the authentication device 1 is configured that the first registered person successfully authenticated in the last session and the second registered person successfully authenticated by the first authentication device 23 are combined and placed first and second in the authentication order. Therefore, as compared to when such a configuration is not adopted, time required for authentication can be reduced since the probability of successful authentication of persons placed first and second in the authentication order is high.

The authentication device 1 is configured to perform biometric authentication and thus tends to take longer time to complete authentication as compared to authentication other than biometric authentication. However, since the authentication device 1 combines the first registered person successfully authenticated in the last session with the second registered person successfully authenticated by the first authentication device 23 and places them first and second in the authentication order to increase the probability of their successful authentication, it is possible to reduce time required for biometric authentication as compared to when such a configuration is not adopted.

In the authentication system 2, it is possible to set the authentication order for plural authentication devices as described above. Therefore, it is possible to effectively reduce authentication time when, e.g., plural authentications are required after authentication by the first authentication device 23.

Authentication by the first authentication device 23 is performed while the handheld device 22 is still outside the vehicle and the authentication order can be set before the user gets in the vehicle and the next authentication is performed. Therefore, as compared to when such a configuration is not adopted, the authentication device 1 and the authentication system 2 can effectively reduce authentication time.

In the meantime, the authentication method in another embodiment includes performing authentication in the authentication order that is set so that the first registered person successfully authenticated in the last session and the second registered person successfully authenticated by another authentication device are combined and are placed first and second in the order.

This authentication method may be realized by, e.g., a computer executable program. ASIC (Application Specific Integrated Circuit) and FPGA (Field-Programmable Gate Array), etc.

According to at least one of the embodiments described above, it is possible to reduce time required for authentication.

Although some embodiments and modifications of the invention have been described, these embodiments and modifications are merely examples and the invention according to claims is not to be limited thereto. These new embodiments and modifications may be implemented in various other forms, and various omissions, substitutions and changes, etc., can be made without departing from the gist of the invention. In addition, all combinations of the features described in these embodiments and modifications are not necessary to solve the problem of the invention. Further, these embodiments and modifications are included within the scope and gist of the invention and also within the invention described in the claims and the range of equivalency.

REFERENCE SIGNS LIST

1 AUTHENTICATION DEVICE
2 AUTHENTICATION SYSTEM
12 BIOMETRIC INFORMATION SENSOR
14 CONTROL UNIT
15 REGISTERED BIOMETRIC INFORMATION
17 AUTHENTICATION ORDER INFORMATION
20 VEHICLE CONTROL UNIT
22 HANDHELD DEVICE
23 FIRST AUTHENTICATION DEVICE
25 ON-VEHICLE DEVICE
122 BIOMETRIC INFORMATION
200 REGISTERED PERSON SETTING INFORMATION
230 REGISTRATION INFORMATION

The invention claimed is:

1. An authentication system, comprising:
a last session information storage portion that stores data of a last registered person successfully authenticated by a first authentication device comprising a biometric information sensor in a last session;
an input unit to which information of a second registered person successfully authenticated by a second authentication device that does not comprise a biometric information sensor is input;
an information acquisition unit that acquires identification information of a user via an information sensor;
a registered person information storage portion that stores registered person information in which a plurality of registered persons including the last and second registered persons are associated with their registration identification information;
an authentication order information storage portion that stores information about an authentication order of the registered persons; and
an authentication unit that authenticates the user by comparing the identification information acquired from the information acquisition unit with the registration identification information stored in the registered person information storage portion according to the authentication order stored in the authentication order information storage portion,
wherein, when the second registered person is successfully authenticated by the second authentication device, the authentication unit changes the authentication order stored in the authentication order information storage portion so that the last registered person and the second registered person are combined and one of the last and second registered persons is placed first and an other of the last and second registered persons is placed second in the authentication order, and wherein the authentication of the user by the authentication unit is conducted based on the changed authentication order.

2. The authentication system according to claim 1, wherein the input unit is electromagnetically connected to the first authentication device that is mounted on a vehicle, communicates with the second authentication device comprising a handheld device carried by a user approaching the vehicle and performs authentication of the second registered person, the information acquisition unit comprises a biometric information sensor that serves as the information sensor and reads biometric information, as the identification information, of the user operating a start switch device of the vehicle, and the registered person information storage portion stores registered biometric information about biometric information of the plurality of registered persons as the registration identification information.

3. The authentication system according to claim 1, wherein the biometric information sensor reads one or more selected from a fingerprint, a vein, a facial image and an iris as the biometric information, and the first authentication device performs the authentication of the user using one or more selected from a fingerprint, a vein, a facial image and an iris that are pre-registered as the registered biometric information.

4. An authentication method, comprising performing authentication in an authentication order that is set so that a last registered person successfully authenticated by a first authentication device comprising a biometric information sensor in a last session and a second registered person successfully authenticated by a second authentication device that does not comprise a biometric information sensor are combined and are placed first and second in the order,
wherein, when the second registered person is successfully authenticated by the second authentication device, an authentication unit changes the authentication order stored in an authentication order information storage portion so that the last registered person and the second registered person are combined and one of the last and second registered persons is placed first and an other of the last and second registered persons is placed second in the authentication order, and wherein the authentication of the user by the authentication unit is conducted based on the changed authentication order.

5. An authentication system, comprising:
a first authentication device comprising a biometric information sensor that performs authentication by checking whether or not a last registered person is a registered person; and
a second authentication device that does not include a biometric sensor and that authenticates a second registered person,
wherein the first authentication device further comprises an authentication unit that performs authentication in an authentication order, and
wherein, when the second registered person is successfully authenticated by the second authentication device, the authentication unit changes the authentication order stored in an authentication order information storage portion so that the last registered person and the second registered person are combined and one of the last and second registered persons is placed first and an other of the last and second registered persons is placed second in the authentication order, and wherein the authentication of the user by the authentication unit is conducted based on the changed authentication order.

6. The authentication system according to claim 5, wherein the first authentication device is mounted on a vehicle, communicates with the second authentication device comprising a handheld device carried by a user approaching the vehicle and performs authentication, and the first authentication device reads biometric information of a user operating a start switch device of the vehicle and performs authentication by comparing the biometric information with registered biometric information that is pre-registered.

7. The authentication system according to claim 6, wherein the handheld device comprises an electronic key or smartphone that is registered with the vehicle.

8. The authentication system according to claim 5, wherein the first authentication device comprises a vehicle control unit that receives an input of biometric authentication information indicating successful authentication when authentication by the first authentication device is successful, and controls a target electronic device on the basis of the successful authentication, wherein the vehicle control unit stores registered person setting information for identifying the registered person, and, when authentication by the second authentication device is successful, identifies the second registered person and outputs the result to the authentication device based on the registered person setting information and authentication information that is output from the second authentication device and includes information of a registered person of the handheld device.

9. An authentication system, comprising:
a last session information storage portion that stores data of a last registered person successfully authenticated by a first authentication device comprising a biometric information sensor in a last session;
an input unit to which information of a second registered person successfully authenticated by a second authentication device that does not comprise a biometric information sensor is input;
an information acquisition unit that acquires identification information of a user via an information sensor;
a registered person information storage portion that stores registered person information in which a plurality of registered persons including the last and second registered persons are associated with their registration identification information;
an authentication order information storage portion that stores information about an authentication order of the registered persons; and
an authentication unit that authenticates the user by comparing the identification information acquired from the information acquisition unit with the registration identification information stored in the registered person information storage portion according to the authentication order stored in the authentication order information storage portion,
wherein, when the second registered person is successfully authenticated by the second authentication device, the authentication unit changes the authentication order stored in the authentication order information storage portion so that the last registered person and the second registered person are combined and one of the last and second registered persons is placed first and an other of the last and second registered persons is placed second in the authentication order, and wherein the authentication of the user by the authentication unit is conducted based on the changed authentication order.

* * * * *